United States Patent Office 3,317,637
Patented May 2, 1967

3,317,637
N-HALOACYLPHOSPHORIC AMIDES
Harry F. Brust, Midland, Mich., assignor to The Dow Chemical Company, Midland, Mich., a corporation of Delaware
No Drawing. Filed Jan. 10, 1964, Ser. No. 336,880
6 Claims. (Cl. 260—959)

This application is a continuation-in-part of my prior copending application Ser. No. 120,909, filed June 30, 1961, and since abandoned.

The present invention is directed to N-haloacylphosphoric amides corresponding to one of the formulae

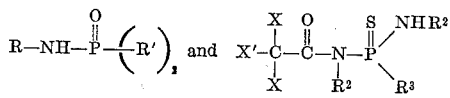

In the above and succeeding formulae, R represents haloalkanoyl; each R' independently represents amino, benzylamino, alkylamino, or monocyanoalkylamino; each $R^2$ independently represents hydrogen or loweralkyl; $R^3$ represents —$NHR^2$ or loweralkoxy; each X independently represents bromo or chloro; and X' represents X or loweralkyl. The expressions "alkyl," "alkoxy," and "alkanoyl" are employed in the present specification and claims to refer to radicals containing from 1 to 5, inclusive, carbon atoms; and the terms "loweralkyl" and "loweralkoxy" are employed to refer to radicals being of from 1 to 4, inclusive, carbon atoms. These novel compounds are oils or crystalline solid materials which are somewhat soluble in many common organic solvents and of very low solubility in water. The compounds are useful as parasiticides and herbicides and are adapted to be employed for the control of a number of plant, mite, helminth, insect, bacterial and fungal organisms, such as aphids, beetles, ticks, worms, screwworms, coontail, and millet.

The compounds of the present invention which are of the formula

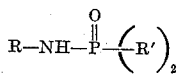

are prepared by reacting a haloalkanoyl phosphoramidic dichloride corresponding with the formula

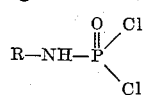

with an amine compound having the formula R'H, with a mixture of two or more of said amine compounds, or successively with two or more of said amine compounds. In similar operations, those compounds of the formula

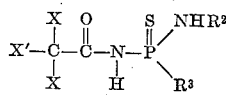

are prepared by reacting a haloalkanoyl phosphoramidothioic dichloride corresponding with the formula

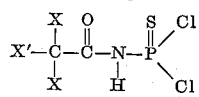

with a nitrogen compound of the formula $NH_2R^2$, and, when —$R_3$ represents —$NHR^2$, with a mixture of two or more of said nitrogen compounds, or successively with two or more of said nitrogen compounds, and, when —$R_3$ represents loweralkoxy, simultaneously or successively in either order with an alkoxide of the formula alkali metal-loweralkoxy Those reactions of the syntheses which involves an amine compound or a nitrogen compound are preferably carried out in the presence of an acid binding agent such as a tertiary amine or an excess of the employed amine or nitrogen compound, and all of the reactions are conveniently carried out in an organic liquid such as diethyl ether, benzene, carbon tetrachloride, and methylene dichloride. The reaction takes place smoothly at the temperature range of from —30 to 50° C. with the production of the desired product and chloride of reaction. This chloride appears in the reaction mixture as the chloride salt of the binding agent.

The amounts of the reactants employed are not critical, some of the desired product being obtained when employing the reactants in any amounts. However, good results are obtained when employing one molecular proportion of the haloalkanoyl phosphoramidic dichloride with about 2 molecular proportions of the acid binding agent and about 2 molecular proportions of one of the amine compounds or a total of about 2 molecular proportions of two of the amine compounds. Thus, for example, when it is desired to produce a mixed product, one molecular proportion of phosphoramidic dichloride is employed with about 2 molecular proportions of the acid binding agent and one molecular proportion of each of two amine compounds.

In other operations, good results are obtained, when —$R^3$ represents —$NHR^2$, by employing one molecular proportion of haloalkanoyl phosphoramidothioic dichloride with about two molecular proportions of acid binding agent and abut two molecular proportions of one of the nitrogen compounds or a total of about 2 molecular proportions of two of the nitrogen compounds. When —$R^3$ represents loweralkoxy, good results are obtained when employing equimolecular proportions of haloalkanoyl phosphoramidothioic dichloride, nitrogen compound, acid binding agent, and alkali metal-loweralkoxy reactant.

In carrying out the reaction, the reactants and, when employed, acid binding agent are contacted together in any convenient fashion and maintained for a period of time in the reaction temperature range to complete the reaction. Following the completion of the reaction, the reaction mixture can be filtered and the reaction medium removed by distillation or evaporation under reduced pressure to obtain the desired product as a residue. This product can be purified by conventional procedures such as washing with water and recrystallization.

Those compounds of the present invention which are of the formula

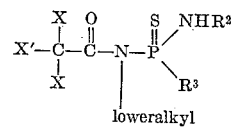

loweralkyl are prepared by reaction a phosphorodiamidate of the formula

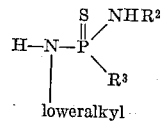

loweralkyl with a haloloweralkanoyl chloride of the formula

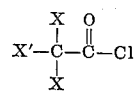

The reaction is carried out in the presence of an acid binding agent, such as a tertiary amine, and conveniently in an organic liquid as inert reaction medium. Suitable organic liquids are diethyl ether, benzene, carbon tetrachloride, or methylene chloride. Good results are obtained when employing the reactants and the acid binding agents in substantially equimolecular proportions. The reaction takes place smoothly at temperatures of from −20° to 70° C., and preferably, at or near room temperatures, with the production of the desired product and chloride of reaction. The chloride appears in the reaction mixture as the chloride salt of the binding agent.

In carrying out the reaction, the reactants and acid binding agent are contacted together in any convenient fashion and maintained for a period of time in the reaction temperature range to complete the reaction. Thus, for example, the haloloweralkanoyl chloride is contacted with the phosphorodiamidate in the presence of the acid binding agent and in the reaction temperature range. Some product is produced immediately upon the contacting of the reactants; however, higher yields result when the reaction mixture is permitted to stand for a period of time in the reaction temperature range. Following the completion of the reaction, the reaction mixture can be filtered and the reaction medium removed by distillation or evaporation under reduced pressure to obtain the desired product as a residue. This product can be purified by conventional procedures, such as washing with water and recrystallization.

The following examples merely illustrate the invention and are not to be construed as limiting.

*Example 1.—N-[bis(methylamino)phosphinyl]-2,2,2-trichloroacetamide*

Gaseous methylamine (5.6 grams; 0.182 mole) was added portionwise with stirring to 11.5 grams (0.0411 mole) of trichloroacetylphosphoramidic dichloride dispersed in 100 milliliters of benzene. The addition was carried out over a period of about 70 minutes and at a temperature of from 6–7° C. Stirring was thereafter continued and the reaction mixture allowed to warm to room temperature to insure completion of the reaction. The mixture was then filtered and the reaction medium removed from the filtrate by vacuum distillation to obtain an N-[bis(methylamino) - phosphinyl] - 2,2,2 - trichloroacetamide product as a crystalline residue. This product melted at 179°–180° C. and had a phosphorus content of 11.5 percent as compared to a theoretical phosphorus content of 11.5 percent.

*Example 2.—N-[bis(benzylamino)phosphinyl]-2,2-dibromopropionamide*

Benzylamine (26.7 grams; 0.248 mole) was added portionwise with stirring to 21 grams (0.0621 mole) of 2,2-dibromopropionylphosphoramidic dichloride. The addition was carried out over a period of 1½ hours and at a temperature of from 0°–10° C. Stirring was thereafter continued and the mixture set aside for 16 hours at 20°–25° C. to insure completion of the reaction. The reaction mixture was then filtered and the filtrate successively washed with water to obtain an N-[bis(benzylamino)phosphinyl]-2,2-dibromopropionamide product as a crystalline solid residue. This product was recrystallized from ethanol and found to melt at 146.5–147.5° C. and to have nitrogen and bromine contents of 8.61 percent and 33.01 percent respectively, as compared to theoretical contents of 8.61 percent and 32.7 percent, respectively.

*Example 3.—N-(ethoxy(methylamino)phosphinothioyl)-N-methyl-2,2,2-trichloroacetamide*

Trichloroacetyl chloride (36.5 grams; 0.2 mole) was added portionwise with stirring to 33.6 grams (0.2 mole) of O-ethyl N,N' - dimethylphosphorodiamidothioate and 22 grams (0.22 mole) of triethylamine, both dispersed in 300 milliliters of benzene. The addition was carried out over 4 hours and at a temperature of 21°–24° C. The reaction mixture was thereafter filtered to separate triethylamine hydrochloride, and the reaction medium removed from the filtrate by evaporation under vacuum to obtain the N - (ethoxy(methylamino)phosphinothioyl)-N-methyl-2,2,2-trichloroacetamide product as a residue. The product residue is then dispersed in cyclohexane, the cyclohexane subsequently removed from the dispersion by evaporation under vacuum and the product found to be an oil having a refractive index $n$ measured at 25° C. for the D line of sodium light of 1.5310.

*Example 4.—N-[bis(dimethylamino)phosphinyl]-2,2,2-trifluoroacetamide*

Dimethylamine (19.6 grams; 0.435 mole) was added portionwise with stirring to 22.5 grams (0.098 mole) of trifluoroacetylphosphoramidic dichloride dispersed in 150 milliliters of benzene. The addition was carried out over 4 hours and at a temperature of 50° C. The reaction mixture was thereafter filtered, the reaction medium removed from the filtrate by evaporation under vacuum and the residue extracted with a petroleum distillate boiling at from 30°–60° C. Upon standing, an N-[bis(dimethylamino)phosphinyl]-2,2,2-trifluoroacetamide product crystallized from the distillate and was separated by filtration, this product was recrystallized from ethanol and found to melt at 95°–97° C. and to have a nitrogen content of 17.1 percent as compared to a theoretical content of 17 percent.

*Example 5.—N-(bis(ethylamino) phosphinothioyl)-N-ethyl-2,2-dichloropropionamide*

2,2-dichloropropionyl chloride (8.1 grams; 0.05 mole) is added portionwise with stirring to a solution of 9.8 grams (0.05 mole) of N,N',N''-triethylphosphorothioic triamide and 5.1 grams (0.05 mole) of triethylamine dispersed in 300 milliliters of benzene. The addition is carried out over a period of about 1 hour and at a temperature of 4–5° C. Stirring is thereafter continued and the reaction mixture allowed to warm to room temperature over a period of two hours to insure completion of the reaction. Subsequently, the reaction mixture is cooled at 5° C. and filtered to separate the triethylamine hydrochloride, and the reaction medium removed from the filtrate by vacuum distillation to obtain the N-(bis(ethylamino)phosphinothioyl)-N-ethyl-2,2 - dichloropropionamide product as a crystalline residue. The product, after recrystallization from chloroform, melts at 44.5–45.5° C.

*Example 6.—N-[bis(2-cyanoethylamino)phosphinyl]-2,2,2-trichloroacetamide*

3-aminopropionitrile (35.0 grams; 0.5 mole) was added portionwise with stirring to 34.5 grams (0.123 mole) of trichloroacetylphosphoramidic dichloride dispersed in 200 milliliters of benzene. The addition was carried out over a period of about 2 hours and at a temperature of from 5° to 15° C. The reaction mixture was thereafter set aside for 16 hours at room temperature and thereafter filtered and the solvent removed from the filtrate by evaporation under reduced pressure. As a result of these operations, there was obtained an N-[bis(2-cyanoethylamino)phosphinyl] - 2,2,2 - trichloroacetamide product as a solid residue. This product was successively recrystallized from a mixture of acetone and a petroleum distillate boiling at from 30° to 60° and from ethanol. The recrystallized product melted at 143.5°–144° C. and had a chlorine content of 30.1 percent as compared to a theoretical content of 30.9 percent.

In a similar manner, other products of the present invention are prepared as follows:

N-[bisdimethylamino)phosphinyl]-2,2,2 - trichloroacetamide (melting at 129.5°–130° C.; phosphorus content of 10.6 percent) by reacting together trichloroacetylphosphoramidic dichloride and dimethylamine.

2-bromo-2-chloro - N - (diaminophosphinothioyl)hexanamide (molecular weight of 322.6) by reacting together 2-bromo-2-chlorohexanoyl chloride and phosphorothioic triamide.

N - [bis(methylamnio)phosphinyl]2,2 - dichlorobutyramide (molecular weight of 263; phosphorus content of 12 percent) by reacting together 2,2-dichlorobutyrylphosphoramidic dichloride and methylamine.

N - ((3 - cyanopropylamino)(methylamino)phosphinyl)-2,2-dichloropropionamide (molecular weight of 299; chlorine content of 23.2 percent) by reacting dichloropropionylphosphoramidic dichloride with 3-cyanopropylamine and methylamine.

N - (diaminophosphinyl) - 2,2,2 - trichloroacetamide (melting at 157°–159° C.; phosphorus content of 12.7 percent) by reacting together trichloroacetylphosphoramidic dichloride and ammonia.

N-(bis(butylamino)phosphinothioyl)-N-butyl-2,2 - dichlorobutyramide (molecular weight of 418.4) by reacting together 2,2-dichlorobutyryl chloride and N,N′,N″-tributylphosphorothioic triamide.

N-[bis(dimethylamino)phosphinyl] - 2,2 - dichloropropionamide (melting at 93–95° C.; phosphorus content of 11.1 percent) by reacting together 2,2-dichloropropionylphosphoramidic dichloride and dimethylamine.

N-[bis(butylamino)phosphinyl]-2,2 - dichloropropionamide (melting at 70°–73° C.; chlorine content of 21.5 percent) by reacting together 2,2-dichloropropionylphosphoramidic dichloride and butylamine.

N-isopropyl-N - ((isopropylamino)methoxyphosphinothioyl)-2,2,2-tribromoacetamide (molecular weight of 489.0) by reacting together tribromacetyl chloride and O-methyl N,N′-diisopropylphosphorodiamidothioate.

N - [bis(methylamino)phosphinyl] - 2,3 - dichloropropionamide (molecular weight of 246; chlorine content of 29 percent) by reacting together 2,3-dichloropropionylphosphoramidic dichloride and methylamine.

N-(bis(methylamino)phosphinothioyl) - 2,2 - dichloropropionamide (having a refractive index n measured at 25° C. for the D line of sodium light of 1.5602 by reacting together 2,2-dichloroprionyl chloride and N,N′-dimethylphosphorothioic triamide.

N-(aminopropoxyphosphinothioyl)-2-bromo - 2 - chlorobutyramide (molecular weight of 337.6) by reacting together 2-bromo-2-chlorobutyryl chloride and O-propyl phosphorodiamidothioate.

N - [bis(methylamino)phosphinyl] - 2,2 - dibromopropionamide (molecular weight of 336.9; bromine content of 45.3 percent) by reacting together 2,2-dibromopropionylphosphoramidic dicholride and methylamine.

N-[bis(propylamino)phosphinyl]-2,2 - dichlorovalerylamide (molecular wegiht of 330; phosphorus content of 9.3 percent) by reacting together 2,2-dichlorovalerylphosphoramidic dichloride and propylamine.

2-bromo-2 - chloro - N - (diaminophosphinothioyl)propionamide (molecular weight of 280.5) by reacting together 2-bromo-2-chloropropionyl chloride and phosphorothioic triamide.

N-((butylamino)(methylamino)phosphinyl) - 2,2 - dichloropropionamide (molecular weight of 288; phosphorus content of 10.1 percent) by reacting together 2,2-dichloropropionylphosphoramidic dichloride, methylamine, and butylamine.

N-(bis(ethylamino)phosphinothioyl)-2,2,2 - trichloro-N-ethylacetamide (having a density measured at 25° C., in comparison with the density of water at 4° C., of 1.3231) by reacting together N,N′,N″-triethylphosphorothioic triamide and trichloroacetyl chloride.

N-[bis(diethylamino)phosphinyl] - 2 - chloroacetamide (molecular weight of 286; chlorine content of 12.2 percent) by reacting together chloroacetylphosphoramidic dichloride and diethylamine.

N-(secondary - butoxy(ethylamino)phosphinothioyl)-2,2-dibromo - N - ethylvaleramide (molecular weight of 466.2) by reacting together 2,2-dibromovaleryl chloride and O-secondary-butyl-N,N′ - diethylphosphorodiamidothioate.

N - [bis(amylamino)phosphinyl] - 2,2 - dichloroacetamide (molecular weight of 345; phosphorus content of 8.8 percent) by reacting together dichloroacetylphosphoramidic dichloride and amylamine.

N-(diaminophosphinothioyl)-3,3,3 - trichloroacetamide (melting at 146° C.) by reacting together ammonia and trichloroacetylphosphoramidic dichloride.

N - [bis(ethylamino)phosphinyl] - 2,2 - difluorobutyramide (molecular weight of 260; phosphorus content of 12 percent) by reacting together 2,2-difluorobutyrylphosphoramidic dichloride and ethylamine.

N-(bis(methylamino)phosphinothioyl) - 2,2 - dibromo-N,3-dimethylbutyramide (molecular weight of 395.1) by reacting together 2,2-dibromo-3 - methylbutyryl chloride and N,N′,N″-trimethylphosphorothioic triamide.

N - (diaminophosphinyl) - 2,2 - difluoropropionamide (molecular weight of 188; phosphorus content of 16.1 percent) by reacting together 2,2-difluoropropionylphosphoramidic dichloride and ammonia.

The compounds of the present invention are useful as parasiticides and herbicides for the control and killing of a number of pests. For such uses, the products are dispersed on a finely divided solid such as chalk or talc or a finely divided solid surface active dispersing agent and the resulting products employed as dusts. Such mixtures can be dispersed in water and employed as sprays. In other procedures, the products are employed as active constituents in solvent solutions, water-in-oil or oil-in-water emulsions, or aqueous dispersions. In representative operations, aqueous compositions containing 1,000 parts per million by weight of N-(bis(dimethylamino)-phosphinyl) - 2,2,2 - trichloroacetamide give 100 percent controls of bean aphids, spider mites, and *Cabomba caroliniana*.

The cyanoalkylamines employed as starting materials in accordance with the present invention, such as 1-cyanopropylamine, 2-cyanopropylamine, 1-cyanomethylamine, 4-cyanobutylamine, di(cyanomethyl)amine and 2-cyanomethyl-2-propylamine are prepared in accordance with known methods. In one such method, the cyanoalkylamines are prepared by reacting an alkali metal cyanide with the corresponding haloalkylamine. In an additional method, some of the cyanoalkylamines are prepared by reacting ammonia and hydrogen cyanide with a suitable aldehyde.

The haloalkanoyl phosphoramidic dichlorides and phosphoramidothioic dichlorides employed as starting materials in accordance with the present teachings are prepared by known procedures, wherein a suitable haloalkanoyl amide is reacted with phosphorus pentachloride ($PCl_5$) to produce a haloalkanoyl phosphoramidic trichloride intermediate having the Formula A:

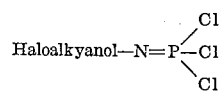

or the formula B:

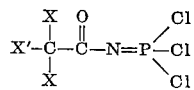

The reaction takes place smoothly at temperatures of from 40° to 70° C., and conveniently in an organic liquid as reaction medium. Upon completion of the reaction, the intermediate material is separated by conventional procedures. Intermediate material of Formula A is thereafter treated with formic acid to produce the desired haloalkanoyl phosphoramidic dichloride starting material of the formula

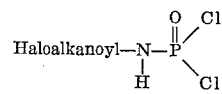

Alternately, the intermediate material of Formula B is treated with thioacetic acid to produce the haloalkanoyl phosphoramidothioic dichloride starting material of the formula

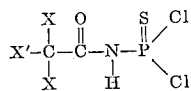

The phosphorodiamidate starting products employed in the preparation of compounds of the present invention are prepared in known procedures. In such procedures, phosphorothioic trichloride of the formula

is reacted with a compound having the formula $NH_2R^2$ and, when $R^3$ represents loweralkoxy, is additionally reacted successively in either order or simultaneously with a compound having the formula alkali metal-loweralkoxy. That portion of the synthesis which employs the $NH_2R^2$ reactant is carried out in the presence of an acid binding agent such as, for example, an organic tertiary amine compound. Conveniently, the reactions are carried out in an inert organic liquid as reaction medium, such as, for example, diethyl ether, benzene, carbon tetrachloride, or methylene chloride.

When $R^3$ represents $-NHR^2$, good results are obtained when employing 1 molecular proportion of phosphorothioic trichloride, 3 molecular proportions of acid binding agent, and 3 molecular proportions of one $NH_2R^2$ reactant or a total of 3 molecular proportions of 2 or 3 of the $NH_2R^2$ reactants. When $R^3$ represents loweralkoxy, good results are obtained when employing 1 molecular proportion of phosphorothioic trichloride, a total of 2 molecular proportions of one or two $NH_2R^2$ reactants, 2 molecular proportions of acid binding agent, and 1 molecular proportion of alkali metal-loweralkoxy reactant.

The reaction is conveniently carried out at temperatures of from $-10°$ to $70°$ C., to prepare the desired phosphorodiamidate product and chloride of reaction. The product is separated and, if desired, purified, by conventional procedures.

I claim:
1. Compounds corresponding to one of the formulae

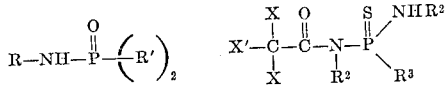

wherein R represents haloalkanoyl, the alkanoyl portion of said moiety containing from 2 to 5, both inclusive, carbon atoms; each R' independently represents amino, benzylamino, alkylamino, or monocyanoalkylamino, the alkyl portion of said moieties containing from 1 to 5, both inclusive, carbon atoms; each $R^2$ independently represents hydrogen or loweralkyl being of from 1 to 4, both inclusive, carbon atoms; $R^3$ represents $-NHR^2$ or loweralkoxy being of from 1 to 4, both inclusive, carbon atoms; each X independently represents bromo or chloro; and X' represents X or loweralkyl being of from 1 to 4, both inclusive, carbon atoms.

2. N-[bis(methylamino)phosphinyl]-2,2,2 - trichloroacetamide.
3. N-[bis(2 - cyanoethylamino)phosphinyl] - 2,2,2 - trichloroacetamide.
4. N-(diaminophosphinyl)-2,2,2-trichloroacetamide.
5. N-(bis(ethylamino)phosphinothioyl)-N-ethyl - 2,2-dichloropropionamide.
6. N - (ethoxy(methylamino)phosphinothioyl) - N-methyl-2,2,2-trichloroacetamide.

No references cited.

CHARLES B. PARKER, *Primary Examiner.*

JOSEPH P. BRUST, *Examiner.*